United States Patent
Sullivan

(10) Patent No.: US 7,553,037 B2
(45) Date of Patent: Jun. 30, 2009

(54) LIGHT DIFFUSION DEVICE FOR A GAUGE DIAL PLATE

(76) Inventor: John T. Sullivan, 11339 Barley Field Way, Marriottsville, MD (US) 21104

( * ) Notice: Subject to any disclaimer, the term of this patent is extended or adjusted under 35 U.S.C. 154(b) by 0 days.

(21) Appl. No.: 11/898,246

(22) Filed: Sep. 11, 2007

(65) Prior Publication Data
US 2008/0002388 A1 Jan. 3, 2008

Related U.S. Application Data

(62) Division of application No. 11/029,346, filed on Jan. 6, 2005, now Pat. No. 7,278,749.

(51) Int. Cl.
*G01D 11/28* (2006.01)
(52) U.S. Cl. ............... 362/26; 362/30; 362/333; 362/334; 362/558; 362/559
(58) Field of Classification Search ............... 362/26, 362/27, 30, 333, 334, 558, 559; 116/287
See application file for complete search history.

(56) References Cited

U.S. PATENT DOCUMENTS

| | | | |
|---|---|---|---|
| 2,217,625 A | 1/1940 | Smith | |
| 2,280,700 A | 4/1942 | Hall | |
| 2,916,011 A | 12/1959 | Molis | |
| 4,163,428 A | 8/1979 | Ishikawa | |
| 4,215,647 A | 8/1980 | Fukasawa | |
| 4,218,726 A | 8/1980 | Fukasawa et al. | |
| 4,274,358 A | 6/1981 | Nakamura et al. | |
| 4,771,368 A | 9/1988 | Tsukamoto et al. | |
| 5,047,761 A * | 9/1991 | Sell | 362/30 |
| 5,839,811 A | 11/1998 | Shimura | |
| 5,905,374 A | 5/1999 | Westberg et al. | |
| 5,915,822 A | 6/1999 | Ogura et al. | |
| 5,934,782 A | 8/1999 | Atkins et al. | |
| 5,982,168 A | 11/1999 | Westberg et al. | |
| 6,137,399 A | 10/2000 | Westbert et al. | |
| 6,276,804 B1 | 8/2001 | Tandler et al. | |
| 6,663,251 B2 | 12/2003 | Calvert | |
| 6,710,718 B2 | 3/2004 | Rose | |

\* cited by examiner

*Primary Examiner*—Stephen F Husar
(74) *Attorney, Agent, or Firm*—Miles & Stockbridge P.C.; Vincent L. Ramik, Esq.

(57) ABSTRACT

A light diffusion device for uniformly dispersing light across a gauge dial plate having indicia associated therewith includes an annular member of transparent or translucent material having front and rear annular surfaces each merging with an outer peripheral surface and an inner peripheral surface. The inner peripheral surface is a frusto-conical widening in a direction from the rear surface toward the front surface to reflect light rays toward the outer peripheral and front surfaces thereby effecting uniform illumination across the front surface, and the outer peripheral surface and frusto-conical inner peripheral surface share a coincident axis of generation.

3 Claims, 6 Drawing Sheets

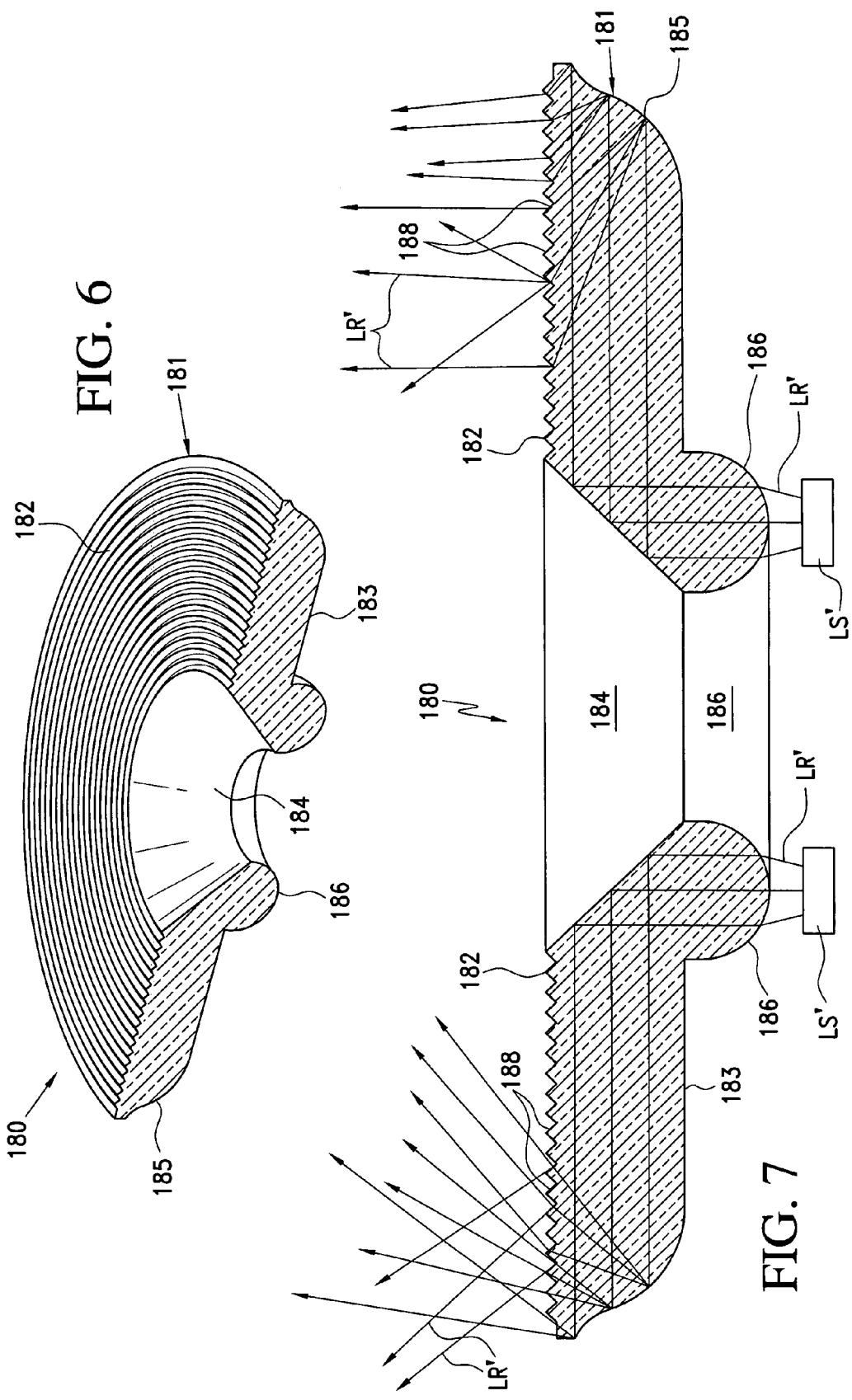

LIGHT DIFFUSION DEVICE FOR A GAUGE DIAL PLATE

This application is a divisional application of U.S. patent application Ser. No. 11/029,346 filed on Jan. 6, 2005 and now U.S. Pat. No. 7,278,749.

FIELD OF THE INVENTION

The invention is directed to gauges, particularly gauges for vehicle (automobiles and trucks) applications, for indicating such conditions as speed, tach, fuel or the like.

Conventional gauges which are primarily sold in the automotive aftermarket are mounted in openings of bezels or upon vehicle dashboards, and normally include an illuminated gauge face and a dial which is rotated by a conventional motor and conventional circuitry to provide instantaneous output reflective of most any vehicle condition, such as speed, torque, tach, fuel, etc. Present gauges, though essentially acceptable to users thereof, lack substantially large well lit gauge face plates with comparable relatively large indicia thereon, particularly along the peripheral edge of the gauge face plate or dial plate, which are also adequately lighted to assure instant and accurate readability. Typical illuminated gauges of the type to which the present invention is directed include a variety of different designs reflected by U.S. Pat. Nos. 2,217,625; 2,280,700; 2,916,011; 4,163,428; 4,215,647; 4,218,726; 4,274,358; 4,771,368; 5,839,811; 5,905,374; 5,915,822; 5,934,782; 5,982,168; 6,137,399; 6,276,804 and 6,663,251.

Of the latter group of patents, U.S. Pat. No. 6,663,251 is perhaps most typical and discloses a gauge with a light-transmitting dial plate having a front face with indicia thereon which is illuminated by a light source behind the dial plate. A light-transmitting pointer rotates relative to the dial plate and an indicator or pointer thereof points generally radially toward the indicia as the pointer rotates in response to electrical signals. The dial plate is viewed through a transparent front face or lens which is held in position by a rim. There is also an annular spacer positioned between the dial plate and the front lens which is smaller than the housing in which the latter components are housed and appreciably smaller than the overall circumference and diameter of the internal surface of the housing and the exterior circumference and diameter of the dial plate. Therefore, an annular area at the outer circumference of the dial plate is hidden from view by the spacer, bears no indicia thereon and is not illuminated, thereby effectively reducing the area of the dial plate which is exposed to a viewer. By thus reducing the overall size of the dial plate and particularly the exterior peripheral illumination thereof, the indicia thereon must be smaller because the indicia is confined to a smaller area and is less readily distinguishable which is highly undesirable when a viewer looks at or checks such gauges instantaneously, particularly when driving at high speed (auto racing).

SUMMARY OF THE INVENTION

In accordance with the foregoing, the present invention provides a novel gauge which includes a housing having a relatively smaller diameter rear housing portion, a radially outwardly directed flange and a substantially larger diameter forward housing portion. Whether mounted in a separate outermost housing atop a dashboard or with the smaller diameter housing portion mounted within a opening of an automotive "A-pillar" or "A-column," the shoulder or flange of the larger diameter portion of the housing provides a seat upon which rests an outer peripheral portion of a light-diffuser plate and atop the latter a gauge face plate or dial plate having printed thereon appropriate indica. A transparent annular spacer ring is sandwiched between the printed gauge face plate and a large transparent front face lens with all of the latter components being held in place by a rim or bezel. Due to the step or shoulder creating a relatively larger housing portion of the overall gauge housing, the area of the light-diffuser plate and the printed gauge face plate can be appreciably increased particularly at a peripherally outermost annular portion thereof. This provides a larger total surface area upon which indicia can be applied resulting in larger individual indicia and correspondingly creates a gauge face plate or dial plate whose indicia can be quickly, readily and unmistakenly viewed and analyzed.

In further accordance with this invention a light pipe disc is provided between the light-diffuser plate or disc and a disc which carries light-generating means, such as LED's. The light pipe disc directs light rays through the light-diffuser plate and the gauge face plate or dial plate, particularly at the radially outermost circumferential edge portion thereof to assure maximum illumination of the printed gauge face plate, particularly the outermost peripheral edge and indicia located thereat and circumferentially spaced relatively thereto.

In further accordance with the present invention, a motor disc carries a motor having a pointer rotating shaft which projects axially outwardly of opposite ends of the motor. One of the ends is connected to and rotates the pointer relative to the printed gauge face plate, while the axially opposite shaft end is exposed through an opening in a bottom wall of the housing through which a back-up tool can be inserted to support the motor shaft when the pointer is assembled to the shaft to thereby prevent motor damage.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 6 is a is an axial cross-sectional perspective view of a light-diffuser plate, and illustrates a plurality of concentric angularly disposed annular facets of a front surface for distributing light uniformly across the rear of a dial plate to uniformly illuminate the entirety thereof.

FIG. 7 is an axial cross-sectional view of the light-diffuser plate or disc of FIG. 6, and illustrates light rays reflected and dispersed by the concentric annular angularly disposed facets of the front surface.

DETAILED DESCRIPTION OF THE INVENTION

Figure 2:
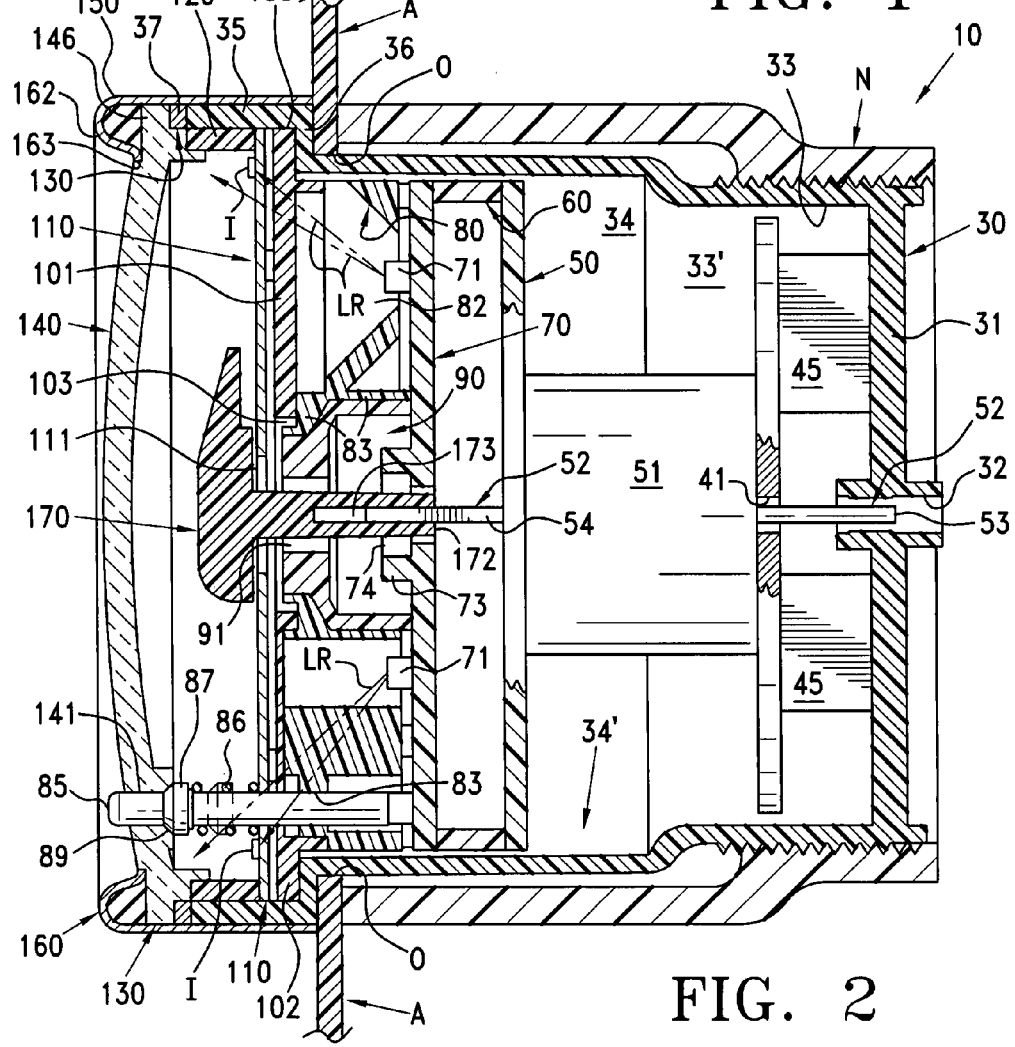
FIG. 2 is a fragmentary axial cross-sectional view of the gauge, and illustrates the gauge mounted in an opening of an "A-column" adjacent a vehicle front windshield, drivers side.

A gauge 10 constructed in accordance with this invention includes a plurality of components including a relatively large outer housing 20, a smaller inner housing 30, a circuit board, plate or disc 40, a motor board, plate or disc 50, an annular spacer ring 60, a light-generating board, plate or disc 70, an annular light pipe board, plate or disc 80, axially internally thereof an annular light pipe 90 (FIGS. 2 and 3), a light-diffuser board, plate or disc 100, a printed gauge face or dial plate 110, an annular transparent spacer ring 120, an annular seal or gasket 130, a large transparent front face lens 140, an annular seal or gasket 150, a rim or bezel 160, and a rotatable dial 170.

Figure 1:
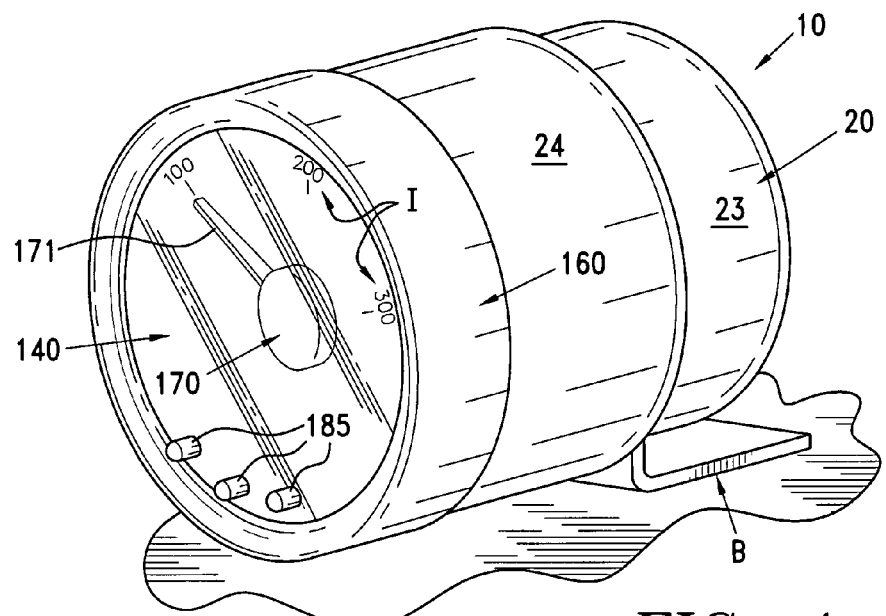
FIG. 1 is perspective view of the novel gauge constructed in accordance with this invention, and illustrates the gauge mounted on a vehicle dashboard and a relatively large front face lens though which can be seen a gauge face plate upon which indica is printed and a rotatable pointer associated therewith.

The large outer housing 20 of the gauge 10 includes a rear wall 21 (FIG. 3) having a circular opening 22 with the rear wall 21 merging with a relatively small diameter wall 23 which in turn merges with a larger diameter wall 24 having an axial annular end face 25. The entire outer housing 20 is formed of plastic material and the substantially cylindrical walls 23, 24 define respective small and large chamber portions 26, 27 with an internal surface (unnumbered) of the wall 23 having screw threads 28 formed therein. The large outer housing 20 is designed to be mounted, if desired, directly upon a portion of an automobile interior, such as a dashboard D (FIG. 1) by a conventional bracket B which may include, for example, a universal joint (not shown).

The smaller inner housing 30 includes an end wall 31 having an axial opening 32 which is oriented substantially oriented coaxially with the opening 22 of the rear wall 21 of the outer housing 20. The bottom or rear wall 31 blends with a substantially smaller cylindrical wall 33 which blends with a substantially larger cylindrical wall 34 which in turn merges with a still larger cylindrical wall 35 through a substantially radially oriented annular wall, shoulder or flange 36. The largest cylindrical wall 35 ends in an axial annular end face 37. Exterior threads 38 on the smallest diameter wall or wall portion 33 are threaded to or unthreaded from the threads 28 of the outer housing 20. The cylindrical wall portions 33, 34 and 35 define respective chamber portions 33', 34' and 35' of the inner housing 30. When the inner housing 30 is threaded via the threads 28, 38 into the outer housing 20, the flange 36 is brought into intimate abutting sealing relationship with the axial annular surface or face 25 of the cylindrical wall 24 of the outer housing 20.

The circuit board, plate or disc 40 is of a conventional construction and is of a substantially circular configuration having a central opening 41 and carries on either or both surfaces thereof conventional circuitry 45 which in part bottoms against or contacts an inner surface (unnumbered) of the rear wall 31 (FIG. 2) of the inner housing 30.

The motor board, plate or disc 50 carries a conventional electric motor 51 having a rotatable shaft 52 including axially opposite and axially oppositely directed shaft end portions 53, 54. The shaft end portion 53 projects through the axial openings or bores 41, 32 of the respective circuit disc 40 and rear wall 31 of the inner housing 30, as is best evidenced in FIG. 3, and is accessible through the opening 22 in the rear wall 21 of the outer housing 20 for a purpose to be described hereinafter.

The spacer ring 60 is of a generally annular configuration and is preferably constructed of transparent plastic. The spacer ring 60 is sandwiched between the motor disc 50 and a light-generating disc or board 70 which carries a plurality of LED's, LCD's or other light sources or light-generating means 71, such as incandescent, cold cathode, electro-luminescent, or UV LED light sources and an associated phosphorous film that changes colors, as is disclosed in U.S. Pat. No. 6,106,127. The light sources 71 are conventionally disposed about the light board or light-generating disc 70 in a manner to direct rays of light to the left, as viewed in FIGS. 3 and 4, upon indicia I (FIG. 1) printed or otherwise applied upon an outermost surface (unnumbered) of the gauge plate 110. The light-generating disc 70 further includes an annular collar 73 (FIG. 3) and an axial opening 74 coaxial with the axis of the motor shaft 52.

Figure 3:
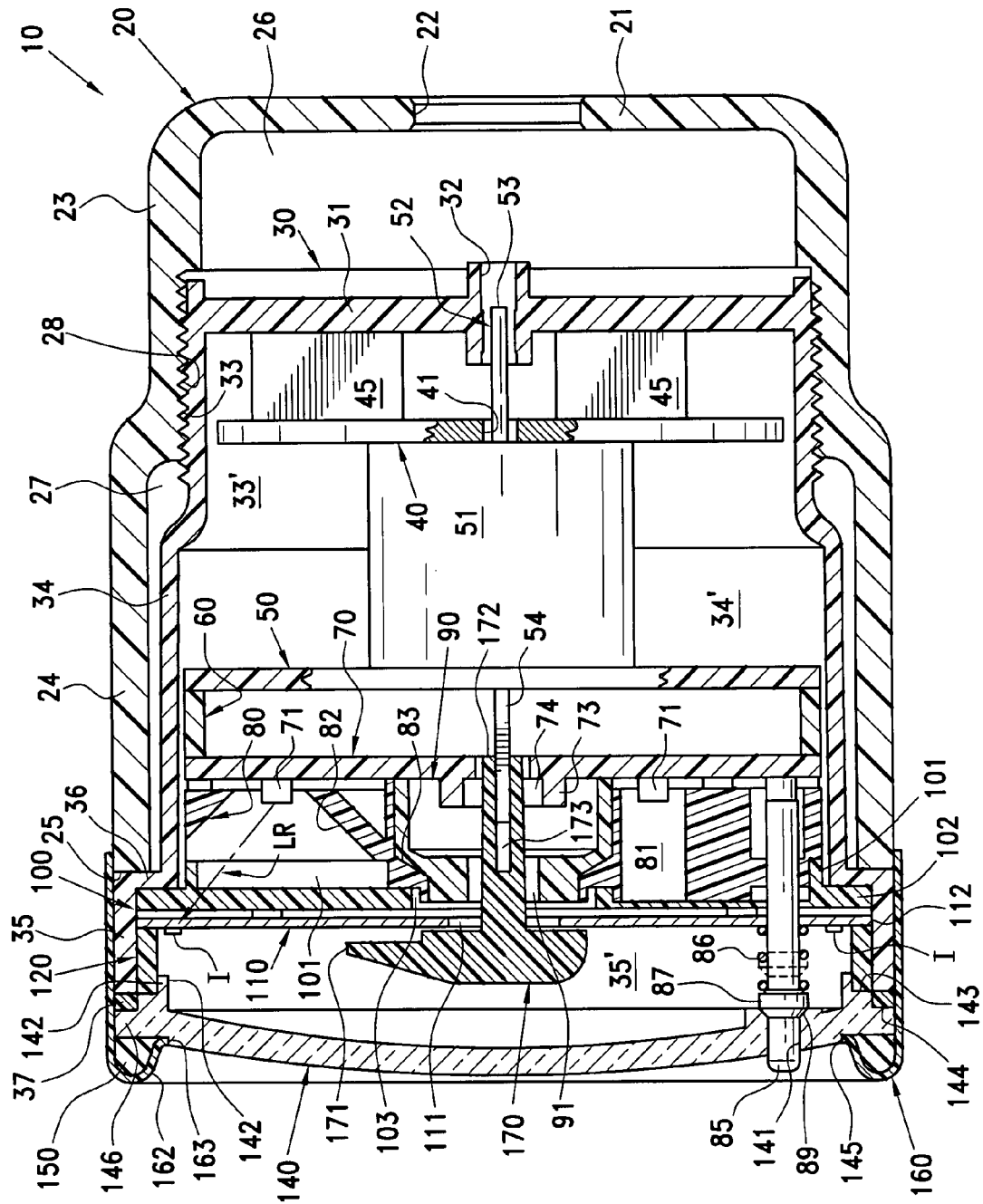
FIG. 3 is an enlarged axially cross-sectional view taken through the gauge of FIG. 1, and illustrates an inner gauge housing defined by an innermost cylindrical annular wall united by an annular wall or flange to an outermost larger cylindrical wall with a substantially annular transparent spacer ring axially spacing a large front face lens from an indicia-bearing gauge face plate and a light-diffuser plate seated on the annular transparent flange.

The annular light-diffuser disc 80 is constructed from transparent or translucent plastic material and includes a plurality of circumferentially located cylindrical light-guiding cavities 81 and a plurality of circumferentially located concavo-convex light-guiding cavities 82 into each of which a selected light-generating source 71 is inserted or aligned, as is best illustrated in FIG. 3. The concavo/convex light-guiding cavities 82 and the surfaces thereof which diverge to the left, as viewed in FIG. 3, assure that light rays emitted from the light-generating means 71 project upon and through the transparent/translucent light-diffuser plate 100, particularly in a radial outward direction and substantially entirely circumferentially thereabout. An axially located stepped collar 83 of the annular light pipe disc 80 intimately receives and houses the transparent/translucent annular axially located light pipe 90 which in turn has an opening or axial bore 91 aligned with the opening or bore 74 of the light-generating disc 70. The annular light pipe disc 80 also includes three bores 83 each slidably receiving a pin 85 biased to the left, as viewed in FIG. 3, by a spring 86. Ends (unnumbered) of the pins 85 each project through a bore 141 of the large front face lens 140 for manipulation thereof to perform function controls of the gauge 10 through the associated circuitry 45 in a conventional manner, including appropriate switches (not shown) which are controlled during appropriate sliding movement of the pin or pins 85. A radially outwardly directed annular collar 87 prevents each pin 85 from moving to the left beyond the position illustrated in FIGS. 2 and 3 of the drawings. An O-ring seal 89 surrounds each pin 85 and is sandwiched between each collar 87 and a rear surface (unnumbered) of the front face lens 140 to prevent moisture, dust and like contaminants from entering the gauge 10 through each bore 141. The transparent or translucent plastic light-diffuser plate 100 includes an axially inwardly directed collar 101 and projecting radially outwardly therefrom is a circumferential wall portion or flange 102 which seats upon the shoulder 36 of the inner housing 30. An axial opening or bore 103 of the light-diffuser plate 100 bears against the annular axially located light pipe or light diffuser 90, as is illustrated in FIG. 3.

The printed gauge face plate 110 is also made of transparent plastic material and the indicia I (FIGS. 1 and 3) is appropriate conventionally printed thereupon and may include such indicators as speed, torque, fuel, time, etc. An axial central opening 111 is coaxial to the shaft 52 of the motor 51 and an outer peripheral or circumferential edge portion 112 of the printed gauge face plate 110 extends completely into the chamber portion 35' and substantially against the internal cylindrical surface (unnumbered) thereof. The spacer ring 120 is also constructed from transparent plastic material and is relatively thin in its axial dimension such that only a minimal peripheral edge of the circumferential edge portion 112 of the printed gauge plate 110 is overlaid thereby. This permits maximum exposure of the indicia I and associated graduations and information upon the printed gauge face plate 110 to be viewed by the user of the gauge 10 under maximum and optimum conditions of illumination which occur because light rays LR emanating from the light sources 71 are directed radially outwardly to the very most outermost circumferential edge of the printed gauge face plate 110. The circumferential edge portion 112 which projects radially outwardly beyond the cylindrical wall 34 of the inner housing 30 augments the peripheral illumination of the indicia I on the printed gauge face plate 110 because the overall area of the printed gauge face plate or dial plate 110 is substantially increased permitting the indica I and gradient markings to be placed virtually at the very edge of the dial plate 110 and thus at a larger size than conventionally heretofore provided.

The dial 170 has a pointer 171 and a stem 172 which in turn includes a bore 173 is appropriately conventionally associated with the printed gauge face plate 110 and the indicia I thereupon. The shaft end portion 54 of the motor shaft 52 is fixed in the bore 173 of the stem 172 of the dial 170 and, as signals are received from engine and related automotive components through appropriate sensors and electrical lines through the aperture or opening 22 in the rear wall 21 and connected to the circuitry 45, the dial 170 is rotated appropriately by the electric motor 51. As is conventional, the dial 170 may be colored to present a contrast to the printed gauge face plate 110 and the indicia I thereupon.

The annular O-seal or gasket 130 prevents ambient conditions from adversely affecting the interior of the gauge 10 and a like seal (not shown) can also be provided for the same purpose between the shoulder 36 of the inner housing 30 and the end face 25 of the outer housing 20.

The large transparent front face or lens 140 includes in addition to the bores 141 earlier described, a rearward projecting annular wall 142, a pair of steps 143, 144 facing or opening toward the rear wall 21 of the outer housing 20 and an additional step or shoulder 145 facing radially outwardly. The seal or gasket 150 is positioned upon an outer peripheral surface portion 146 of the lens 140 and is substantially normal to the surface 145. The rim 160 is initially completely cylindrical and an innermost skirt portion 161 thereof is bonded or otherwise secured to the cylindrical wall 35 of the inner housing 30 (and/or the wall 24 of the outer housing 20). Thereafter, the cylindrical rim 160 is rolled to form a curl 162 which compresses the gasket or seal 150, brings all components into intimate relationship and a free inboard peripheral edge 163 of the rim 160 bears against the peripheral edge 145 of the transparent front face or lens 140.

As is best illustrated in FIG. 3 of the drawings, and as described heretofore, the light rays LR fully illuminate the entirety of the printed gauge face plate 110 and particularly the peripheral edge portion 112 thereof which has heretofore been unprovided due to the absence in any known/conventional gauges of both (a) an enlarged forward face due to the presence of the flange or shoulder 36 of the inner gauge housing 30 and (b) the construction of the light-diffuser plate or disc 80 which directs the light rays LR to the very outermost circumferential peripheral edge portion 112 of the printed gauge face plate 110. The latter allows the indicia I to be printed appreciably further outboard or radially outwardly from the axis of the gauge 20 than heretofore provided in known gauges which in turn allows the indicia I to be printed larger and thus more readily visually seen and comprehended by a viewer when the gauge 10 is in use.

In order to facilitate rapid and correct assembly of the various components of the gauge 10 heretofore described, the invention also includes several additional unique aspects, including sub-assemblies of the various discs or plates and rings heretofore described which are unitized prior to assembly into and with respect to the smaller inner housing 30.

Figure 4:
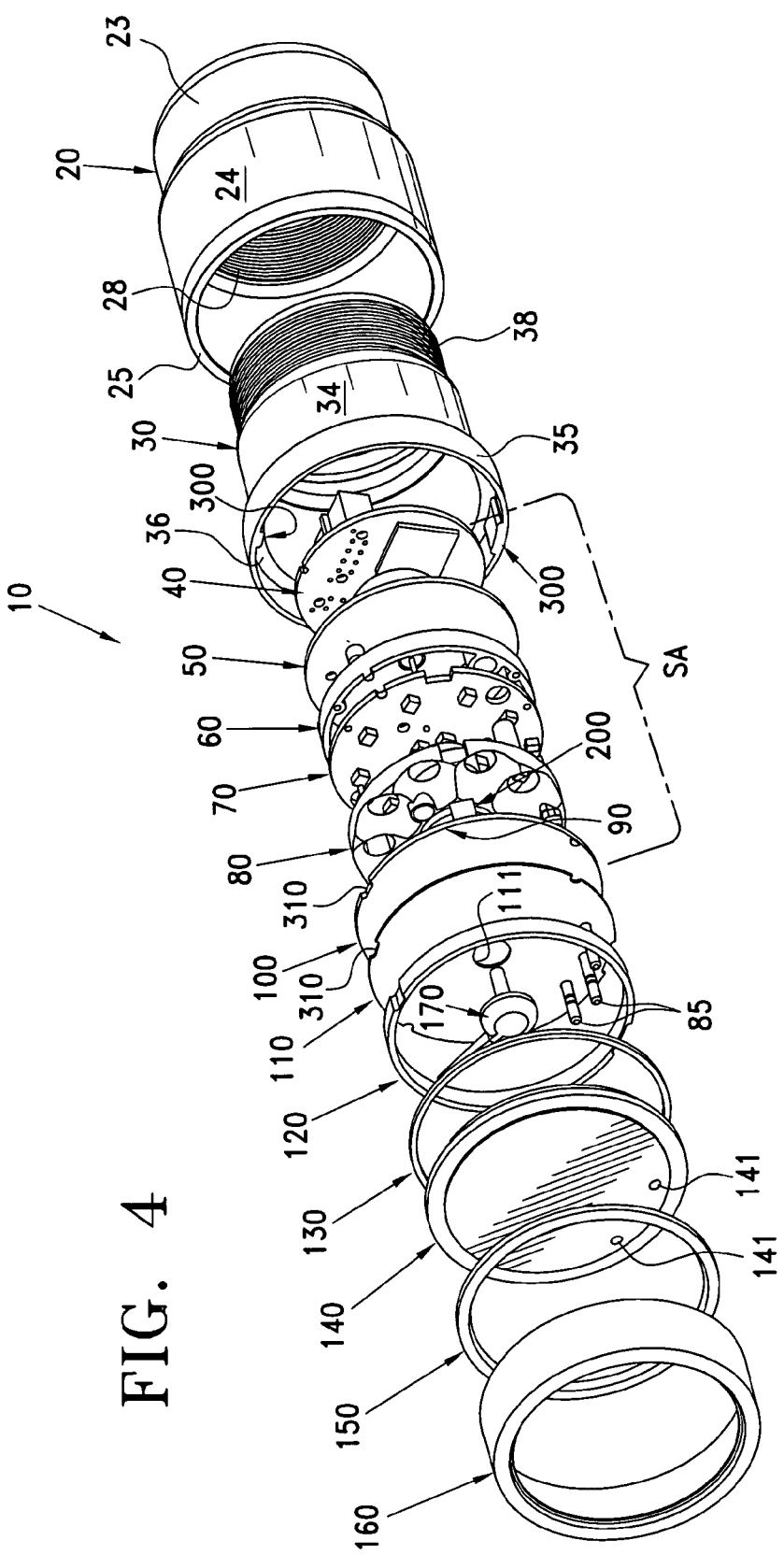
FIG. 4 is an exploded perspective view of the gauge of FIG. 3, and illustrates components thereof when viewed from left-to-right in FIG. 3.

As an example of the latter, the circuit board or circuit disc 40, the motor disc 50, the spacer ring 60, the light-generating disc 70, the annular light pipe disc 80, the associated annular axially located light pipe 90 and the light-diffuser plate 100 are preferably secured together as a subassembly SA (FIG. 4). The subassembly SA is first snap-secured together by a pair of snap-securing tongues 200 (FIG. 5) which are disposed in substantially diametrically opposite relationship and are of a length to snap behind the circuit disc 40 after the discs 40, 50, 70, 80, 100 and the spacer ring 60 and the light pipe 90 have been properly axially assembled and circumferentially oriented. Thereafter, the snap-secured together subassembly SA is primarily secured together by screws (not shown) passing through access openings of the latter discs, excluding the annular spacer 60 and the light pipe 90, and being united in threads of the endmost of the discs or nuts associated therewith. When thus assembled, the subassembly SA of FIGS. 4 and 5 of the drawings, can be inserted into the inner housing 30 to the position best illustrated in FIG. 3 with the motor shaft end portion 53 of the motor shaft 52 being partially located within the bore 32 of the rear wall 31 of the inner housing 30. At this time the outer housing 20 is not yet screw-threaded to the inner housing 30. The subassembly SA and the inner housing 30 are then positioned in a jig which includes a back-up mandrel (not shown) which is received in the bore 32 and engages the end (unnumbered) of the shaft end portion 53. As the remaining components, such as the printed gauge face plate 110, the spacer ring 120, etc., are positioned within the cylindrical wall 35, neither the inner housing 30 nor the shaft 52 can move to the right under any left-to-right assembly forces applied to the latter components. This is particularly true and of major importance upon the assembly of the dial 170 when the bore 173 of the stem 172 is forced upon the shaft end portion 54 of the motor shaft 52. Since the opposite shaft end portion 53 bottoms against the anvil (not shown) of the jig, an assembly force applied to the dial 170 from left-to-right, as viewed in FIG. 3, cannot be transmitted to the shaft 52. Thus, since the shaft 52 is rendered immobile during this assembly, the internal sensitive components of the motor 51 and those carried by the shaft 52 will not be damaged or in any fashion adversely effected. The aforementioned jig also provides backup for forces created when the cylindrical skirt or rim 160 is folded into the curl 162 as the final assembly step of the process.

Figure 5:
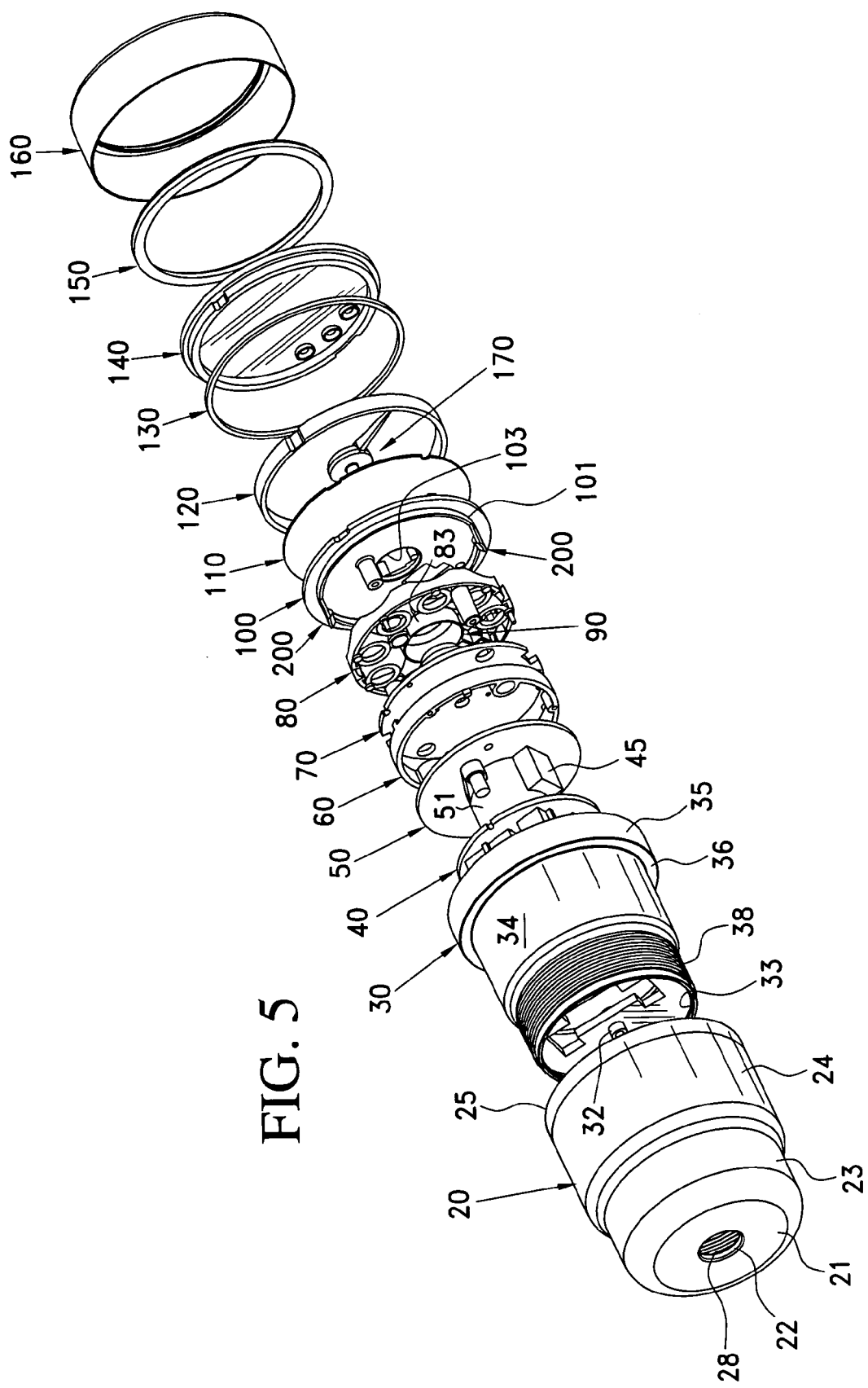
FIG. 5 is another exploded perspective view of the gauge of FIG. 3, and illustrates the components thereof when viewed from right-to-left in FIG. 3.

As can be appreciated from viewing FIGS. 4 and 5 of the drawings, it is absolutely essential that the individual components of the gauge 10 be accurately circumferentially assembled with respect to the inner housing 30, and the latter is accomplished by alignment means 300, 310 in the form of diametrically opposite inwardly projecting alignment ribs 300, 300 of the inner housing 30 and diametrically opposite alignment slots 310, 310 in the peripheries of each of the discs 100, 110, the spacer ring 120 and the transparent lens 140. Since the disc 100 is part of the subassembly SA, the diametrically opposite grooves 310, 310 thereof will accurately guide the subassembly SA via the ribs 300, 300 into the inner housing 30. Thereafter, the disc 110, the spacer ring 120 and the transparent lens 140 can be guided by the slots 310, 310 thereof into the inner housing 30 under the guidance of the ribs 300, 300.

As was described heretofore, the outer housing 20 of the gauge 10 is utilized when the gauge 10 is mounted by the bracket B upon the dashboard of an automotive (FIGS. 1 and 3) vehicle. However, when the gauge 10 is to be mounted in a hole or opening O in an automotive "A-pillar" or "A-column"(A in FIG. 2), the outer housing 20 is unthreaded from the inner housing 30 and the inner housing is appropriately inserted into and secured to the opening O by a special nut N in the manner readily apparent from FIG. 2. Normally, the standard A-pillar opening O is of a size corresponding to the maximum outside diameter of a conventional gauge. However, as noted earlier herein, the shoulder or flange 36 of the inner housing portion 30 (FIG. 3) projects well beyond the opening O and permits utilization of the larger size and area of the gauge dial face plate 110 then heretofore possible in prior art automotive gauges. The latter thereby achieves the utilization of larger indicia I than heretofore provided in conventional gauges.

In lieu of the annular light-diffuser disc 80 heretofore described, another light-diffuser disc 180 is illustrated in FIGS. 6 and 7 of the drawings and is generally designated by the reference numeral 180. The light-diffuser disc 180 is constructed from transparent or translucent plastic material and includes a generally annular body 181 defined by a front surface 182, a rear surface 183, an inner annular frusto-conical peripheral surface 184 and an outer peripheral surface 185. A generally axially projecting annular shoulder surface or collar surface 186 merges with the rear surface 183 and the inner peripheral surface 184, the latter of which is substantially frusto-conical and widens in a direction from the rear surface 183 toward the front surface 182. The front surface 182 is defined by a plurality of substantially concentric light ray-directing facets or lens 188 with each facet being defined by two walls disposed at an angle of substantially 90 degrees to each other. As light from a light source LS' directs light rays LR' toward the collar surface 186 and the rear surface 183, the light rays LR' are reflected/re-reflected in the manner indicated by the unnumbered headed arrows associated therewith in part by the annular frusto-conical surface 184 and thereafter by the multiplicity of facets 188 thereby substantially dispersing light uniformly across the front face 182 and upon a rear surface of a dial plate (not shown). Due to the uniform dispersion of the light rays LR' and the uniformity of the light exiting the facets 188 of the front surface 182, intense lighting of dial plates which create "night blindness" in the past is substantially entirely eliminated. Instead, the entire substantially larger face of the dial plate is uniformly illuminated from the rear, absent conventional light-intensity spots.

Figure 8:
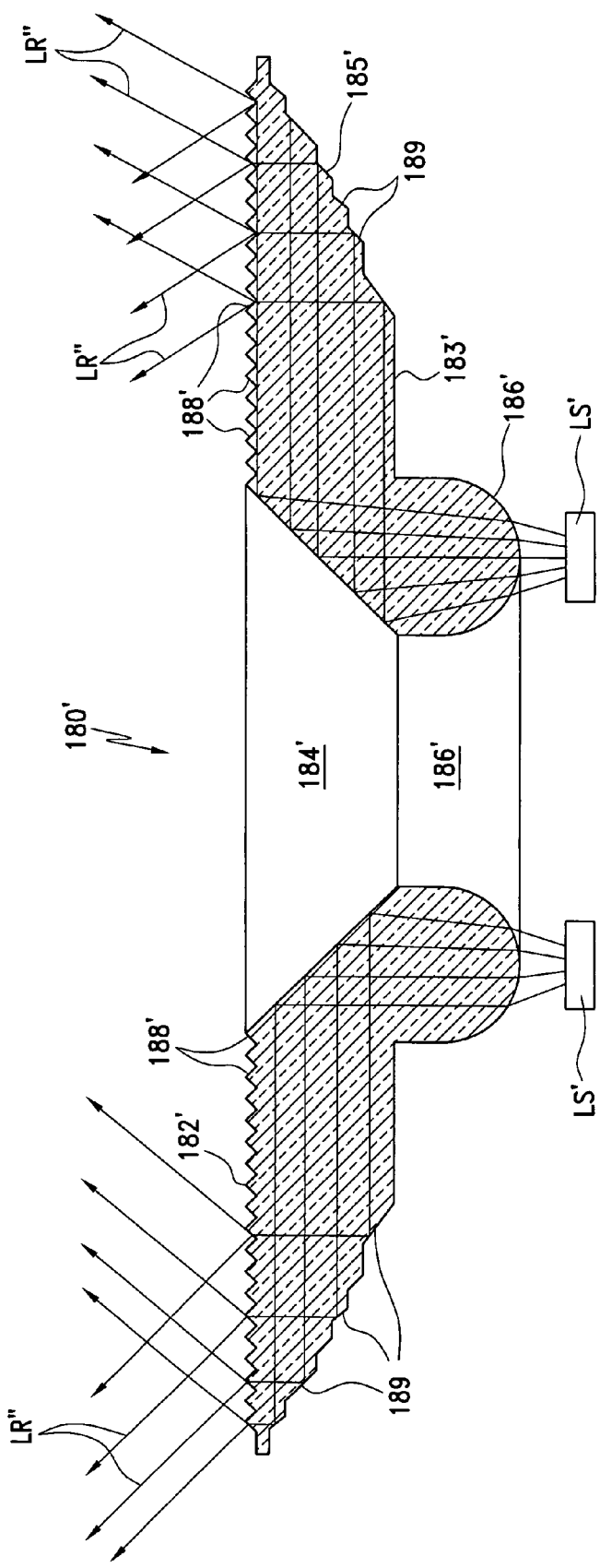
FIG. 8 is an axial cross-sectional view of another light-diffuser plate or disc, and illustrates light rays reflected and dispersed by concentric annular angularly disposed facets of front and outer peripheral surfaces of the light-diffuser disc.

Another substantially annular light-diffuser disc is illustrated in FIG. 8 of the drawings and is generally designated by the reference character 180' with additional prime numerals being applied thereto corresponding to like structure of the light diffuser 180, including a front surface 182' and concentric annular angularly disposed facets or lens 188'. In this case, the diffuser disc 180' includes at an outer peripheral surface 185' thereof a plurality of concentric annular facets or lenses 189 which create additional light ray reflection/diffusion than the light diffuser disc 180, as is readily apparent by comparing the generated and emitted light rays LR', LR" designated by the headed arrows in FIGS. 7 and 8, respectively.

Although a preferred embodiment of the invention has been specifically illustrated and described herein, it is to be understood that minor variations may be made in the apparatus without departing from the spirit and scope of the invention, as defined by the appended claims.

What is claimed is:

1. A light diffusion device for uniformly dispersing light across a gauge dial plate having indicia associated therewith comprising a substantially annular member made of at least one of transparent and translucent material, said annular member including front and rear substantially annular surfaces each merging with an outer substantially peripheral surface and an inner substantially peripheral surface, said inner substantially peripheral surface being of a frusto-conical configuration widening in a direction from said rear surface toward said front surface to reflect light rays toward said outer peripheral and front surfaces thereby effecting substantially uniform illumination across said front surface, said outer peripheral surface and frusto-conical inner peripheral surface share a coincident axis of generation, a substantially annular shoulder projecting axially away from said rear annular surface in substantially surrounding relationship to a narrowest end of said inner peripheral frusto-conical surface, said annular shoulder being of a substantially convex configuration whereby light waves from a light source directed toward said annular shoulder surface are directed substantially axially toward said frusto-conical surface and radially therefrom outwardly toward said outer peripheral surface, and said outer peripheral surface including a surface portion for redirecting the radial light rays toward said front annular surface and a plurality of light ray directing facets thereof which uniformly disperse light across an associated gauge dial plate.

2. The light diffusion device as defined in claim 1 wherein the surface portion of the outer peripheral surface for redirecting the radial light rays toward the front annular surface is defined by a plurality of light ray directing facets.

3. The light diffusion device as defined in claim 1 wherein the surface portion of the outer peripheral surface for redirecting the radial light rays toward the front annular surface is defined by a convex curved surface.

* * * * *